United States Patent [19]

Kumasaka et al.

[11] Patent Number: 4,666,393
[45] Date of Patent: May 19, 1987

[54] APPARATUS FOR MANUFACTURING POLYURETHANE FOAM SLABS IN A BATCH

[75] Inventors: Sadao Kumasaka; Satomi Tada, both of Tokyo; Osamu Fujii, Konosu; Goro Yoneyama; Masao Idei, both of Kawagoe, all of Japan

[73] Assignee: Human Industry Corporation, Tokyo, Japan

[21] Appl. No.: 872,960

[22] Filed: Jun. 11, 1986

[51] Int. Cl.⁴ .................... B29C 39/24; B29C 67/20
[52] U.S. Cl. .................................. 425/204; 425/225; 425/258; 425/447; 425/817 R
[58] Field of Search ............... 425/4 R, 817 R, 225, 425/256, 258, 447, 62, 574, 200, 204; 264/51, 54

[56] References Cited

U.S. PATENT DOCUMENTS

| | | | |
|---|---|---|---|
| 2,588,151 | 3/1952 | Nelson et al. | 425/817 R |
| 3,172,925 | 3/1965 | Preotle | 264/54 |
| 3,377,297 | 4/1968 | Hanlin | 264/54 |
| 3,590,438 | 7/1971 | Ritter | 425/4 R |
| 3,642,392 | 2/1972 | Vanderhagen | 425/4 R |
| 3,692,442 | 9/1972 | Gerbert | 425/4 R |
| 3,752,623 | 8/1973 | Sinn et al. | 425/4 R |
| 3,788,337 | 1/1974 | Breer | 425/4 R |
| 4,060,354 | 11/1977 | Smith | 425/817 R |
| 4,260,355 | 4/1981 | Röhrig et al. | 425/258 |

OTHER PUBLICATIONS

Polyurethane Handbook, pp. 160-171, edited by Dr. Günter Oertel, Hanser, Munich

*Primary Examiner*—Willard E. Hoag
*Attorney, Agent, or Firm*—Frishauf, Holtz, Goodman & Woodward

[57] ABSTRACT

An apparatus for continuously manufacturing polyurethane foam slabs in a batch, which comprises a cylindrical tank for developing polyurethane foam, having an inlet at the side wall thereof for introducing therein polyurethane feed solution; a stirring tank for forming polyurethane foam feed solution, which is mounted on a carriage movably placed in proximity to the cylindrical tank; stirring blades mounted within the stirring tank; a discharge pipe extending from a lower side of the stirring tank to discharge the feed solution through the inlet into the cylindrical tank; pipes for introducing raw materials into the stirring tank; and a pipe for introducing a washing solvent for removing the raw materials. The cylindrical tank is interchangeably connected with the stirring tank through the discharge pipe.

3 Claims, 6 Drawing Figures

APPARATUS FOR MANUFACTURING POLYURETHANE FOAM SLABS IN A BATCH

BACKGROUND OF THE INVENTION

1. Field of the Invention:

This invention relates to an apparatus for manufacturing polyurethane foam slabs in a batch and, in particular, an apparatus for manufacturing them in a continuous fashion.

2. Description of the Prior Art:

Polyurethane foam slabs are usually of a large-sized block type and are cut into slices of a desired thickness or configuration. Conventionally, such slices have found a wider application to an interior design and cushioning material for vehicles.

In the most common method, slabs around 30 to 40 m in length have been manufactured by continuously discharging a polyurethane foam feed solution into a recessed conveyor belt and expanding it therein. This method has a greater advantage of assuring a higher production efficiency.

A batch-type manufacturing method has also partly been adopted which introduces a foam feed solution into a large-sized tank where it is expanded and raised. This method is inferior to the aforementioned continuous method with respect to its reproductivity and, in addition, can be implemented at a relatively narrow location. According to the method, slabs of a desired size can be manufactured by using a foam tank of a corresponding size. For a cylindrical slab a long sheet can effectively been obtained by peeling off or slicing the cylindrical slab, while the latter is rotated.

These known methods have, however, the following disadvantages:

In the continuous manufacturing method using the recessed conveyor belt, a 30 to 60 m production line is needed, requiring a wider spacing and thus a relatively large workshop. Since a slab of a substantially rectangular cross-section is obtained according to this method, a slicing machine has to be reciprocated many times to obtain a sheet of a desired thickness. It is, therefore, difficult to improve a quantity production in high yield. Furthermore, the slab which is substantially rectangular in cross-section is irregularly formed at its top face and has a rough surface and a hardened layer. It is, therefore, necessary to cut off the top surface portion of the slab a few centimeters from its top face, offering a material loss problem.

Indeed, the conventional batch type method has the advantage of requiring a bulky apparatus and a larger installation spacing, but it is far inferior to the continuous method with respect to its productivity, thus posing a critical problem.

SUMMARY OF THE INVENTION

It is accordingly the object of this invention to provide an apparatus for manufacturing polyurethane slabs in a continuous fashion, while adopting a batch-type method. According to this invention, polyurethane slabs can be mass produced in high yield, while retaining the advantage obtained from a conventional batch system.

According to this invention there is provided an apparatus for continuously manufacturing polyurethane slabs in a batch, comprising:

a cylindrical foam tank having a flat bottom and an upper end opened;

an inlet openable at a side wall of the foam tank and through which a polyurethane foam feed solution is introduced into the tank;

a carrier placed in proximity to the foam tank such that it is movable;

a stirring tank for mixture which is fixed on the carrier;

stirring blades mounted within the stirring tank;

a discharge pipe diagonally extending downward from a side of a lower end portion of the stirring tank to permit the feed solution to be discharged therethrough;

a pipe for introducing a polyurethane foam feed solution component into the stirring tank;

a pipe for introducing a washing solvent for the foam feed solution into the stirring tank;

an electromagnetic valve mounted in the discharge pipe; and a drive device for moving the carrier in which the polyurethane foam feed solution is supplied through a corresponding pipe into the stirring tank to cause it to be homogeneously stirred; the carrier is moved, causing the forward end portion of the aforementioned pipe to be introduced into the foam tank to permit the electromagnetic valve to be opened to flow the foam feed solution from the stirring tank into the foam tank; and while the solution is expanded and raised with the carrier retracted and thus the feed solution inlet of the foam tank closed, the washing solvent is introduced through the corresponding pipe into the stirring tank, washing away the polyurethane foam feed solution which is left deposited onto the inner wall of the stirring tank.

According to this invention, it is possible to perform the automatic, continuous manufacturing of polyurethane foam slabs in a batch, i.e., an operation including the preparing of the feed solution through its measurement and mixing, discharging of the feed solution into the foam tank, and washing away of the stirring tank. The automatic, continuous operation can be performed in high yield according to this invention in comparison with a conventional batch-type method by which a greater amount of human intervention is necessary in the continuous manufacture of polyurethane foam slabs.

Furthermore, the apparatus of this invention can be installed in a relatively narrow spacing and cylindrical polyurethane foam slabs can be manufactured in a continuous fashion which can assure a high level of productivity at the slicing of the cylindrical polyurethane foam slab. Therefore, the apparatus of this invention is very advantageous over the conventional counterpart using the recessed conveyor belt.

DETAILED DESCRIPTION OF THE PREFERRED EMBODIMENTS

An apparatus for manufacturing polyurethane foam slabs in a batch according to this invention will be explained below with reference to the accompanying drawings.

Figure 1:
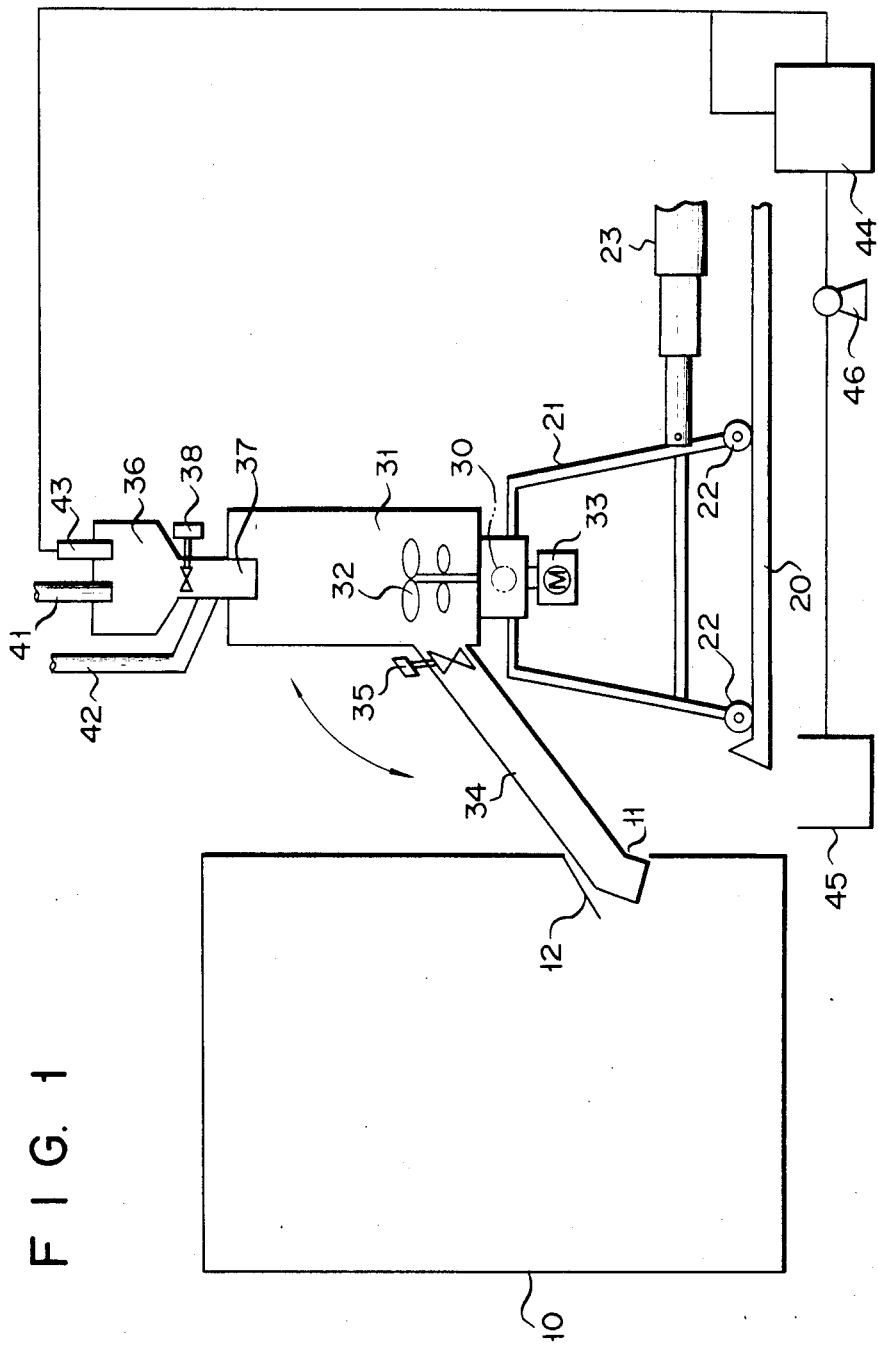
FIG. 1 schematically shows an apparatus according to this invention which manufactures polyurethane foam slabs in a batch.

In FIG. 1, foam tank 10 is formed as a cylindrical unit having an open upper end and a flat base end. Foam tank 10 has an inlet 11, at the side wall, with openable door 12 attached to inlet 11. A feed solution for foaming is fed into foam tank 10 through inlet 11. The tank is placed on a turntable, not shown, and can be moved sequentially, while being rotated.

Rails 20 are located in the neighborhood of foam tank 10, and carrier 21 is placed on the rails with casters 22 attached to the legs of carrier 21. Carrier 21 is moved toward and away from foam tank 10 by actuating extrusion cylinder 23. Rotation shaft 30 is horizontally mounted on carrier 30 with cylindrical stirring tank 31 pivotally mounted on rotation shaft 30. Rotation shaft 30 is driven by a motor and speed change gear, not shown, to permit the stirring tank to be swung through a tilting angle in a direction indicated by an arrow in FIG. 1. In this connection it is to be noted that stirring tank 31 may be mounted directly on carrier 21. Within tank 31, stirring blades 32 are mounted in the axial direction of tank 31 and rotated by motor 33 which is located below the stirring tank. Discharge pipe 34 is fixed to the lower side wall of stirring tank 31 and diagonally extends downward to permit the feed solution to be supplied to tank 10. Discharge pipe 34 communicates with stirring tank 31 through electro-magnetic valve 35 which is located at a boundary area between pipe 34 and tank 31. Measuring tank 36 for an isocyanate component is positioned above the stirring tank and connected through pipe 41 to a supply source for an organic isocyanate. Feed supply tube 37 is placed at the lower end of measuring tank 36 with electro-magnetic valve 38 located at an area therebetween. To the side wall of feed supply pipe 37 is connected feed supply pipe 42 which supplies polyurethane foam components, such as polyol and catalyst, into tank 31 to the exclusion of the isocyanate component.

Furthermore, supply pipe 43 for a washing solvent for the feed solution is attached to organic isocyanate component measuring tank 36 and connected to solvent tank 44. Tray 45 for a spent solvent is connected to solvent tank 44 through pump 46.

The operation of the aforementioned apparatus will be explained below:

With pushing cylinder 23 retracted and thus stirring tank 31 retracted, a polyurethane foam feed solution is prepared. Stated in more detail, the organic isocyanate component is supplied through pipe 41 into measuring tank 36 and measured there. Then, electro-magnetic valve 38 is opened, introducing a predetermined amount of isocyanate component through supply pipe 37 into stirring tank 31. At the same time, the other materials, such as polyol component and catalyst, are introduced through pipe 42 into stirring tank 31. Then stirring blades 32 are rotated to cause these materials to be homogeneously mixed through a stirring motion.

When pushing cylinder 23 is extended, stirring tank 31 is moved forward to a position shown in FIG. 1 to permit the forward end of discharge pipe 34 to be inserted through inlet 11 into foam tank 10. At this time, door 12 is pushed by the discharge pipe, causing the door to be readily opened. Then electromagnetic valve 35 is opened, permitting the foam feed solution which has been prepared within stirring tank 31 to be poured into foam tank 10 through discharge pipe 34. At this time, stirring tank 10 is tilted ahead, permitting a ready flow of the foam feed solution into tank 10.

Then pushing cylinder 23 is retracted and thus stirring tank 31 is moved backward to allow door 12 to be closed. The expanding and rising of the polyurethane foam feed solution progress within foam tank 10, thus obtaining a desired polyurethane foam slab.

During the time in which the polyurethane foam slab is prepared within tank 10, some of the feed solution belt deposited on the inner wall of stirring tank 31 and measuring tank 36 is washed away with the stirring tank at the withdrawn position. That is, pump 46 is driven and thus the washing solvent is supplied from tank 36 through pipe 43 into measuring tank 36 and thence into stirring tank 31 so that the tank is filled with the solvent. Then stirring vanes 32 are rotated, dissolving the feed solution left deposited on the inner wall of stirring tank 31. If this is done, electromagnetic valve 35 is opened to allow the solvent to the discharged through discharge pipe 34 so that the feed solution left deposited on the inner wall thereof is also washed away. The spent solvent, after being stored in tray 45, is circulated by pump 46 into solvent tank 44 for recycling.

At the completion of such a washing cycle, the foam feed solution is again prepared as in the same operation as before. Foam tank 10 held with the feed solution is shifted on a rotating turntable, not shown, and another foam tank is located instead in the indicated position on the turntable. In this way, polyurethane foam slabs can be manufactured in the same continuous process as set forth above.

According to this invention, the apparatus for the manufacture of polyurethane foam slabs can be installed at a relatively narrow location and cylindrical foam slabs can be continuously manufactured in a batch, thus prominently improving a quantity production in comparison with a conventional batch system.

Although in the aforementioned embodiment the foam tank has been explained as having a cylindrical configuration, it may take any proper form, for example, a cubic configuration.

As the foam tank, use may be made of a structure in which in the expansion process of the feed solution the expansion level is permitted to be raised together with the corresponding inner wall thereof.

Figure 2:
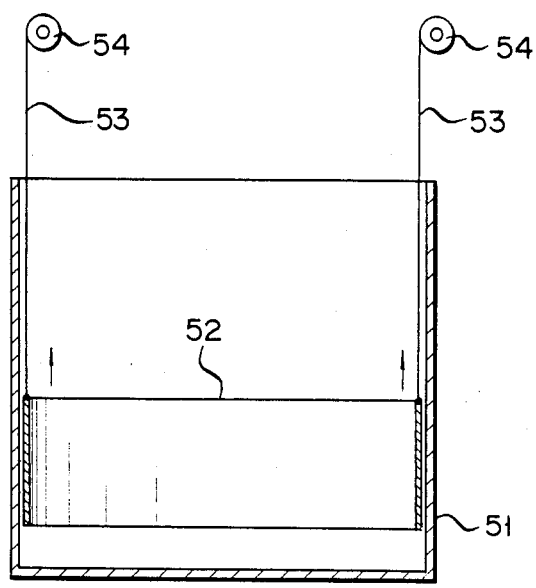
FIG. 2 is a cross-section showing a modified form of a foam tank in an apparatus of this invention.
Figure 3:
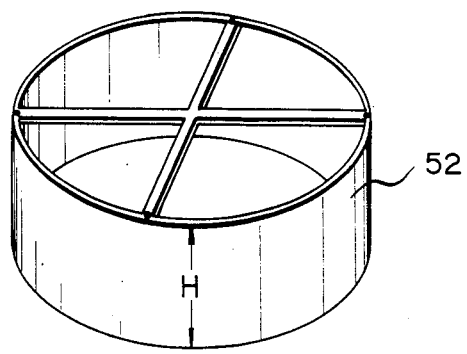
FIG. 3 is a perspective view showing a cylindrical member held in the foam tank of FIG. 2.

FIG. 2 is a cross-section showing a foam tank for the manufacture of the polyurethane foam slab in a batch process in accordance with this invention. In FIG. 2 large-sized cylindrical tank 51 has an upper open end and a flat bottom, as in the case of a conventional structure. Cylindrical member 52 with both ends opened as shown in FIG. 3 is placed within the cylindrical tank such it can slide along the inner side wall of the cylindrical tank. Wire 53 is connected to the upper end of cylindrical member 52, and cylindrical member 52 can be freely raised or lowered by winding or rewinding the wire around rollers 54 by means of a motor, not shown. In this connection it is to be noted that the height, H, of cylindrical member 52 is usually of the order of, properly, 20 to 60 cm.

In the manufacture of polyurethane foam slabs in a batch on the apparatus of this invention, a sheet release agent is covered on the inner surface of cylindrical tank 51 as in the conventional foam tank. A release agent or release sheet if also covered on the inner surface of cylindrical member 52.

Figure 4A:
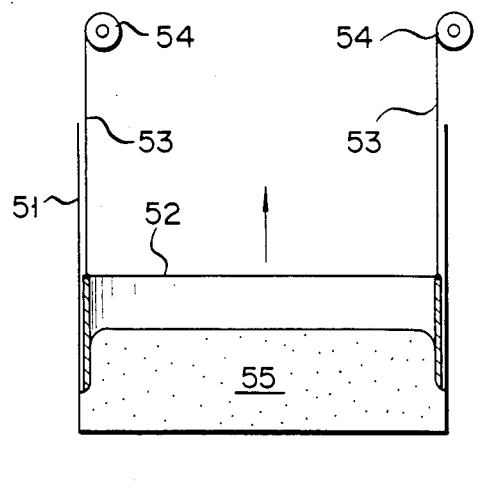
FIGS. 4A to 4C are cross-sectional views showing the steps of manufacturing polyurethane foam slabs with the use of the foam tank of FIG. 2.
Figure 4B:
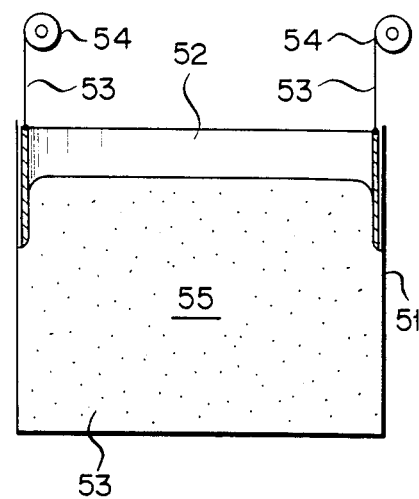
Figure 4C:
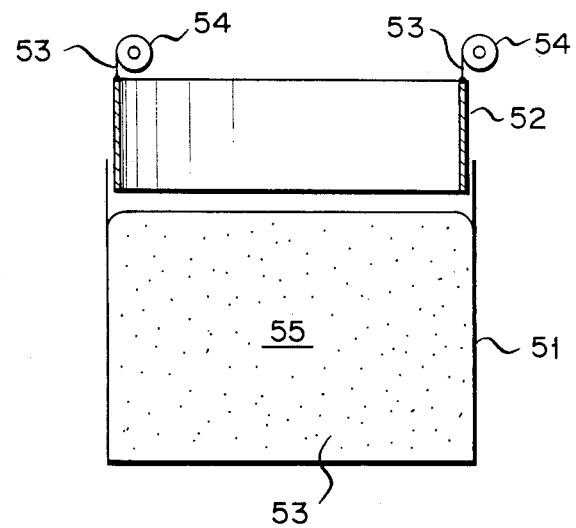

When a polyurethane foam feed solution is charged into the foam tank, while under a stirring action, it is expanded and raised under a forming action. As shown in FIG. 4A, cylindrical member 52 in contact with a surface portion of feed solution 55 now being raised is lifted up with the same velocity as the rise velocity as shown in FIG. 4B. After the rise in the level of the feed solution under the expanding action is completed, the cylindrical member is lifted up as shown in FIG. 4C.

As a result, even if the level of the feed solution is moved up due to the expansion of the feed solution, a portion of the foam tank contacting cylinder member 52 in the neighborhood of the level suffers no frictional resistance. There is no possibility that an expansion of the feed solution will be prevented at the marginal edge of a resultant slab and the level is lowered. According to this invention no such a defect is encountered so that it is possible to manufacture cylindrical polyurethane foam slabs each with a flat top surface as shown in FIG. 4C.

Although this invention has been explained as manufacturing cylindrical polyurethane foam slabs in a batch, it may be applied to the manufacture of prismatic polyurethane foam slabs in a foam tank of a corresponding configuration.

Although, in the aforementioned embodiment, use has been made of the means for lifting up cylindrical member 52, it may be replaced by any other proper means.

As set out above, polyurethane foam slabs can be continuously manufactured in a batch on the apparatus of this invention, thus offering an advantage inherent in the batch system. It is also possible to improve a mass production in high yield in comparison with the conventional batch system. Furthermore, the foam tank used in the manufacture of the polyurethane foam slabs in a batch in accordance with this invention imparts no frictional resistance to the foam feed solution expanded and raised along the inner surface of the foam tank. It is, therefore, possible to manufacture cylindrical polyurethane foam slabs having a flat-topped surface.

What is claimed is:

1. An apparatus for manufacturing polyurethane foam slabs in a batch, comprising:
    a cylindrical foam tank having a flat bottom and an upper end opened;
    an inlet openable at a side wall of the foam tank and through which a polyurethane foam feed solution is introduced into the tank;
    a carrier placed in proximity to the foam tank such that it is movable;
    a stirring tank for mixture which is fixed on the carrier;
    stirring blades mounted within the stirring tank;
    a discharge pipe diagonally extending downward from a side of a lower end portion of the stirring tank to permit the feed solution to be discharged therethrough;
    a pipe for introducing a polyurethane foam feed solution component into the stirring tank;
    a pipe for introducing a washing solvent for the urethane foam feed solution into the stirring tank;
    an electromagnetic valve mounted in the discharge pipe; and
    a drive device for moving the carrier.

2. An apparatus according to claim 1, further including a drive device arranged associated with said stirring tank pivotally mounted on a rotation shaft extending horizontally relative to said carrier, said drive device permitting the stirring tank to swing around said rotation shaft, whereby when said polyurethane foam feed solution within said stirring tank is flowed into said foam tank said stirring tank is tilted forward to permit the polyurethane foam feed solution to be readily flowed into the foam tank.

3. An apparatus according to claim 1, further including a cylindrical member having upper and lower open ends and placed within said foam tank such that it is liftable along an inner side wall of said foam tank, in which when said urethane foam feed solution introduced into said foam tank is expanded said cylindrical member is movable upward with a level of said polyurethane foam feed solution movable to a corresponding extent.

* * * * *